KENNETH M. ALLEN
CHESTER H. HARPER
INVENTORS

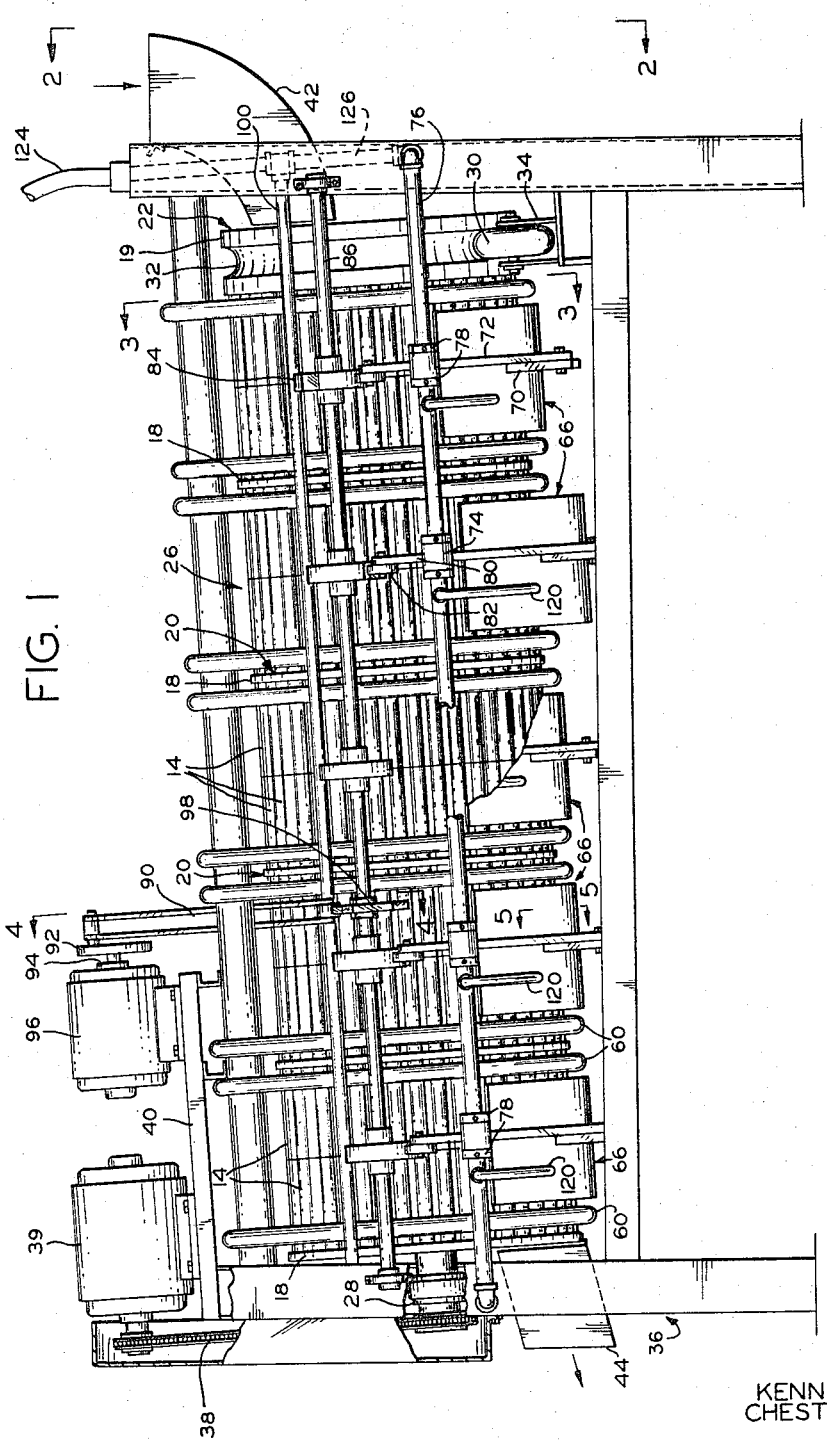

BY BUCKHORN, BLORE, KLARQUIST & SPARKMAN
ATTORNEYS

Sept. 17, 1968     K. M. ALLEN ET AL     3,401,726
APPARATUS FOR REMOVING STEMS FROM CHERRIES
Filed Feb. 21, 1966                     3 Sheets-Sheet 3
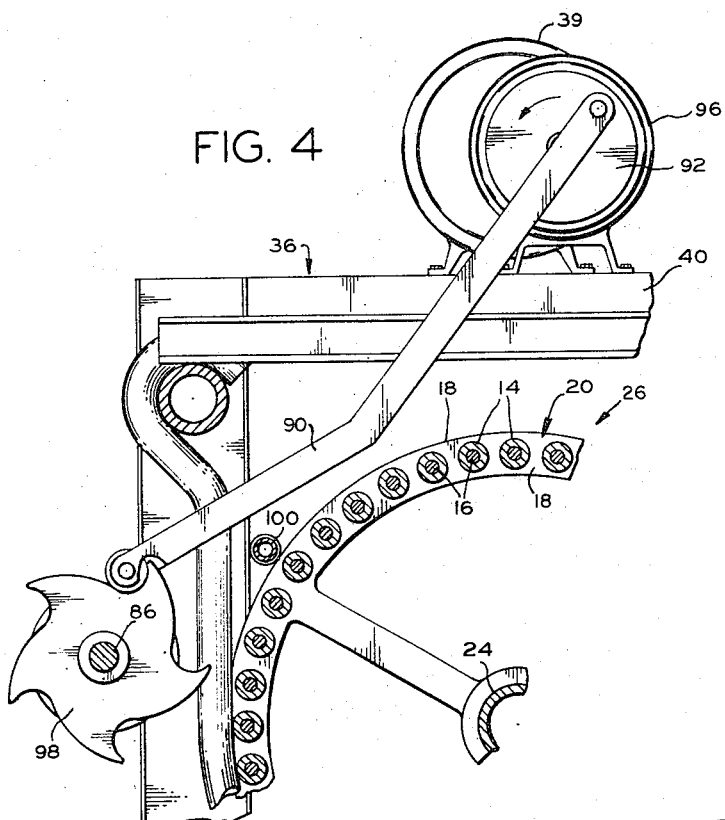
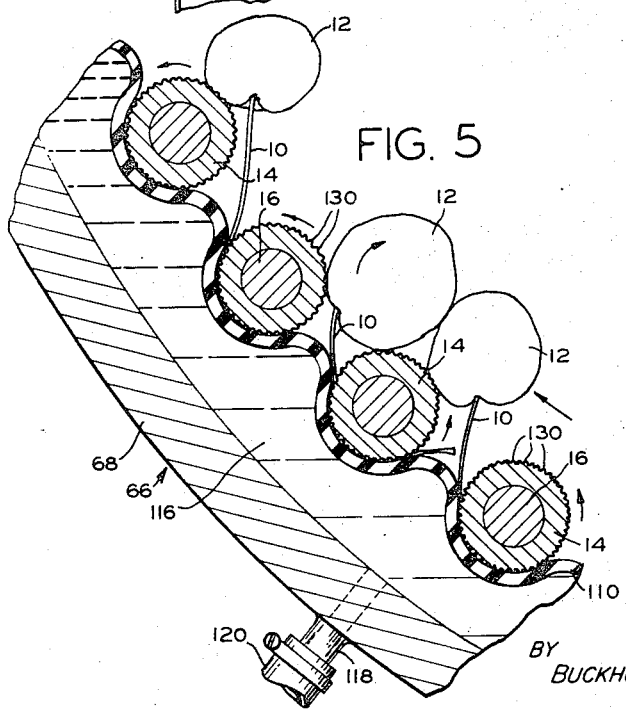
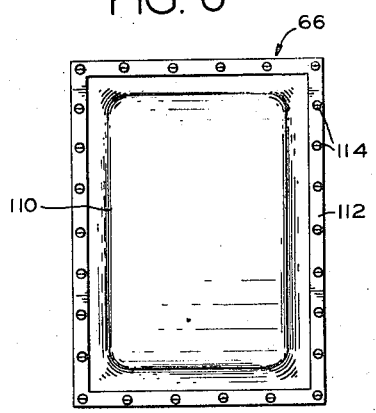
KENNETH M. ALLEN
CHESTER H. HARPER
INVENTORS
BY
BUCKHORN, BLORE, KLARQUIST & SPARKMAN
ATTORNEYS

United States Patent Office 3,401,726
Patented Sept. 17, 1968

3,401,726
APPARATUS FOR REMOVING STEMS FROM CHERRIES
Kenneth M. Allen and Chester H. Harper, both of P.O. Box 352, Newberg, Oreg. 97132
Filed Feb. 21, 1966, Ser. No. 528,861
11 Claims. (Cl. 146—55)

ABSTRACT OF THE DISCLOSURE

A series of rods are arranged in the form of a drum which is rotated, and cherries with stems are fed therealong. A series of hollow pads pressed against the rods to grip the stems and resilient tubes rotate the rods to turn the cherries to tear them incrementally from the gripped stems. A camshaft periodically moves each pad to a retracted position for flushing stems therefrom.

Description

This invention relates to an apparatus for removing stems from cherries, and more particularly to apparatus for pulling cherry stems angularly from cherries.

An object of the invention is to provide a new and improved apparatus for removing stems from cherries.

Another object of the invention is to provide an apparatus for pulling cherry stems angularly from cherries.

A further object of the invention is to provide an apparatus for gripping a long portion of a cherry stem while pulling the stem from a cherry.

Another object of the invention is to provide an apparatus in which a flexible membrane is pressed by fluent material against and between rollers being rolled therealong to grip elongated portions of cherry stems against the rollers, which roll the cherries, and pull each stem from the cherry at an angle relative to the natural position of the stem relative to the cherry.

Yet another object of the invention is to provide an apparatus for removing stems from cherries having a plurality of short, fluted rollers mounted rotatably in end-to-end relationship.

A further object of the invention is to provide an apparatus for removing stems from cherries having a plurality of rollers arranged in cylinder-like formation and revolved past an elastic strand which rotates the rollers.

Another object of the invention is to provide an apparatus for removing stems from cherries in which cherries are advanced along a plurality of rollers along which are positioned a plurality of pressers which coact with the rollers to pull stems from the cherries and which are moved by turns away from the rollers and are flushed to remove stems therefrom.

The invention provides an apparatus for removing stems from cherries including means for pulling a cherry stem from a cherry and means for rotating the cherry as the stem is pulled so that the stem pulls loose from the cherry incrementally proceeding around the stem. Preferably the apparatus includes a plurality of parallel fluted rollers arranged to form a cage-like cylinder and revolved past a plurality of presser pads which engage stems of cherries extending between adjacent rollers and press the stems against the rollers. This tensions the stems. The rollers are rotated by contact with the pads and also by elastic strands engaging the rollers. Rotation of the rollers rolls the cherries as the stems are tensioned, which causes the stems to pull loose from the cherries starting at one side of the stem and proceeding around the stems to the other side thereof. Preferably the pads are pressed against the rollers by a fluent material under pressure, so that the pads tend to wrap partially around the rollers to grip elongated portions of the cherry stems to provide a sure, low pressure grip. The pads preferably are pulled by turn away from the rollers and water is applied thereto to flush away stems on the pads.

A complete understanding of the invention may be obtained from the following detailed description of an apparatus for removing stems from cherries forming a specific embodiment thereof, when read in conjunction with the appended drawings, in which:

FIG. 1 is a side elevation view of an apparatus for removing stems from cherries forming one embodiment of the invention;

FIG. 4 is an enlarged, fragmentary, vertical sectional view taken substantially along line 4—4 of FIG. 1;

FIG. 5 is an enlarged, fragmentary, vertical sectional view taken substantially along line 5—5 of FIG. 1; and FIG. 6 is an enlarged view taken substantially along line 6—6 of FIG. 3.

Figure 3:
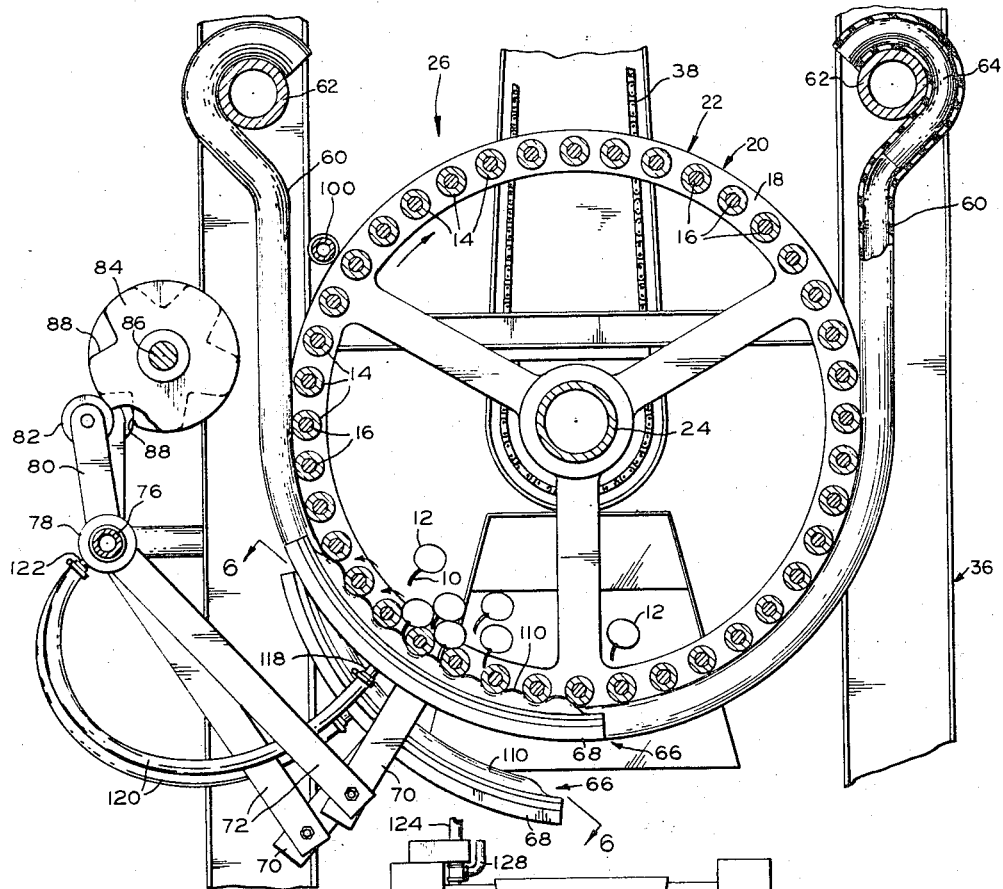
FIG. 3 is an enlarged vertical sectional view taken substantially along line 3—3 of FIG. 1.

Referring now in detail to the drawings, there is shown therein an apparatus for removing stems 10 (FIG. 5) from the cherries 12 by so rolling the cherries as the stems are pulled that the stems break away from the cherries incrementally starting at one side of the cherries and proceeding around the stems to the other side of the stems, thereby reducing the pull required to minimize the tendency of the stems to break. The apparatus also grips the stems over elongated portions thereof so that each stem is gripped very firmly but with a minimum lateral or transverse pressure on the stem which further minimizes breakage of the stems. The apparatus includes a plurality of short, sleeve-like, fluted rollers 14 mounted rotatably on each of a plurality of parallel, elongated rods or arbors 16 extending through rings 18 and 19 (FIGS. 1 and 3) of spiders 20 and 22 keyed to a drive shaft 24 to define a cage-like, hollow drum or cylinder 26.

The cylinder is mounted rotatably in a slightly inclined position by a radial-and-thrust bearing 28 journaling the shaft 24 and rubber tired wheels 30 extending into a groove 32 in the ring 19 of the spider 22. The bearing 28 and brackets 34 mounting the wheels 30 rotatably are mounted on a frame 36, and the shaft is driven by a chain and sprocket drive 38 driven by an electric motor 39 mounted on a platform 40 of the frame. The cherries 12 (FIG. 5) with the stems 10 attached thereto are supplied to the upper, entrance end of the cylinder 26 by a supply chute 42 (FIG. 1), travel down the cylinder as they are rolled by the cylinder and de-stemmed, and are discharged through a discharge chute 44 into a suitable receptacle or conveyor (not shown).

A plurality of rubber or plastic tubes or strands 60 (FIGS. 1 and 3) which are resilient, are mounted on longitudinal tubular members 62 of the frame 40 in pairs by hooks 64 positioned in the upper ends of the tubes. The tubes 60 are under tension and frictionally engage the lower ones of the rollers 14 to rotate or roll the rollers as they are revolved along the tubes. The tubes are positioned adjacent the spiders 20.

A plurality of pressers 66 (FIGS. 1, 3 and 5) coact with the rollers 14 to pull the stems 10 from the cherries 12. The pressers include arcuate backing plates 68 fixed rigidly to posts 70 fixed rigidly to arms 72 fixed rigidly to sleeves 74 rotatable on a pipe 76 of the frame 40 between pairs of thrust collars 78. Follower arms 80 fixed rigidly to the sleeves 74 carry follower rolls 82 urged by the arms 80 against notched cams 84 keyed to a shaft 86 which is journaled on the frame in a position parallel to the pipe 76. Each cam 84 has a notch 88 staggered relative to the notches in the other cams, and a pawl 90 (FIG. 4) driven by a crank disc 92 driven through reduction gearing 94 by an electric motor 96 drives a ratchet wheel 98 fixed to the shaft 86 to cause one of the notches 88 (FIG. 3) to always be adjacent one of the follower rolls 82 so that one of the pressers 66 is always drawn away from the drum 26 for flushing stems therefrom. The other pressers are pressed by the cams 84 into operative engagement with the drum 26. Flushing is effected by water sprayed downwardly by a pipe 100. This water also continuously washes the drum 26.

Figure 2:
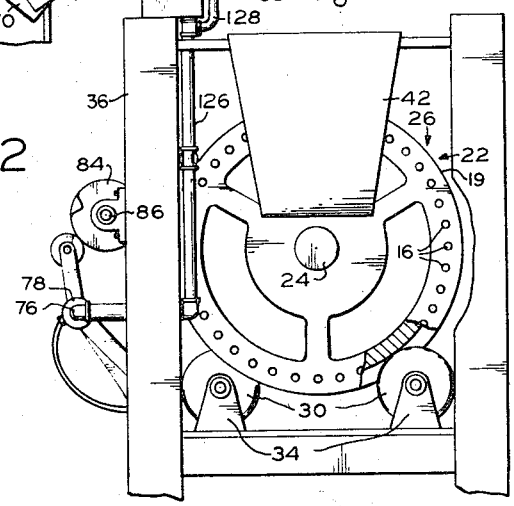
FIG. 2 is an end view taken substantially along line 2—2 of FIG. 1.

Each presser comprises a pad formed by the backing plate 68 and a flexible, resilient membrane 110 (FIG. 5) of rubber or plastic material and held at its margin by a clamping ring 112 (FIG. 6) in seating engagement with the backing plate. Screws 114 secure the ring 112 to the backing plate. Fluent material 116 (FIG. 5), which in the present instance is water under about three pounds per square inch pressure but which may be another liquid or air under pressure or flaxseed or another easy flowing powder, is supplied to the interiors of the pressers by pipes 118 and hoses 120 (FIGS 1, 2 and 3) leading from pipes 122 connected to the interior of the pipe 76. A hose 124 (FIGS. 1 and 2) leading to a source of water under pressure supplies water to the pipe 100 and the pipe 76 through piping 126 which includes an overflow pipe 128 (FIG. 2) open to atmosphere at its upper end to provide the desired predetermined head of pressure. The pressure forces the flexible, elastic membranes 110 (FIG. 5) partially around the rollers 14 and between the rollers to effect an elongated wrapping action on the rollers and the stems 10 therebetween, the wrapping extending at least about 90° around the rollers. The rollers are fluted to form low, wide angle or blunt ridges or ribs 130 preferably extending along the rollers parallel to the longitudinal axes of the rollers. To facilitate fluting of the rollers, the rollers are somewhat short in length, two rollers being provided between each pair of spiders.

Operation

The drum 26 (FIG. 1) is rotated slowly by the motor 39 to revolve the rollers 14, and the rollers are rotated on the rods 16 as the rollers are rolled along the tubes 60 and the pressers 66. Cherries 12 with stems 10 are introduced into the drum through the chute 42, and the cherries are gently rolled or tumbled along the drum to and through the discharge chute, the stems being removed during the travel along the drum. As the cherries with the stems thereon are rolled by the drum, the stems drop between the rollers 14 (FIG. 5) as illustrated by the lowermost cherry 12. The rollers 14, which are being rolled along the membrane 10, roll over the free ends of the stems, grip the stems with the membrane, and roll on up the stems to pull the cherries against the rollers. The rollers roll the cherries in a clockwise direction as the rollers and the membrane are tensioning the stems, which rolling is aided by the action of gravity on the cherries, the pressers 66 being positioned to engage a somewhat inclined portion of the drum. The rollers and the membrane tension the stems and the rolling of the cherries moves the cherries relative to the stems to form large angles between the stems and the normal, radial positions of the stems. This pulls each stem loose from the cherry to which it is attached starting with one side of the stem and proceeding around the sides of the stem to the other side. This incremental separation between the stem and the cherry requires much less tension of the stem than is required if the pull on the stem is radial relative to the cherry. The rollers are spaced apart not appreciably farther than one-half the diameter of the cherries and the membrane projects partially between the adjacent rollers and approaches the rollers somewhat tangentially so that the free ends of the stems freely enter the tapered space between the rollers and the membrane. The portion of the membrane engaging each roller subtends an angle of at least 90° of the roller to provide elongated gripping surfaces which grip elongated portions of the stems. This gripping is very strong because of the length and the snubbing effect while a low transverse pressure is applied to the stems so that crushing and breaking of the stems is prevented. The ribs 130 are somewhat shallow and blunt so that they do not cut into the cherries or the stems but do securely grip the stems and do engage the cherries sufficiently to roll them.

The above described apparatus softly grips elongated portions of the stems 10 and rolls the cherries 12 relative to the stems as the stems are pulled loose from the cherries. This soft grip of the stems and the incremental pulling of each stem from the cherry prevent breaking of the stems while very effectively pulling the stems from the cherries. Also, since the ribs are blunt, they do not scuff the cherries.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:
1. In an apparatus for removing stems from cherries,
    gripping means including a hollow pad having fluid material therein for gripping a stem attached to a cherry,
    and means for effecting relative movement between the gripping means and the cherry to pull the stem from the cherry.
2. In an apparatus for removing stems from cherries,
    a plurality of rollers in spaced parallel positions,
    means for rotating the rollers,
    and presser means including a hollow pad having a flexible membrane urged against and partially around the rollers and fluid material under pressure in the pad.
3. The apparatus of claim 2 wherein the presser means comprises a plurality of pads each including the membrane,
    and mounting means for pressing the pads toward and the membranes against the rollers and for retracting the pads seriatim periodically from the rollers.
4. The apparatus of claim 3 wherein the mounting means includes a plurality of levers each mounting one of the pads,
    means mounting the levers rotatably on an axis extending parallel to the drum means,
    a plurality of notched cams engaging the levers for holding the pads against the rollers,
    and means for rotating the cams to permit the pads to be retracted from the rollers.
5. The apparatus of claim 2 including means for flushing stems from the membranes.
6. In an apparatus for removing stems from cherries,
    a plurality of rods,
    a plurality of spiders mounting the rods in parallel positions spaced around the peripheries of the spiders,
    a plurality of rollers mounted rotatably on the rods to form a drum with the rods and the spiders,
    means journaling the spiders for rotation on a generally horizontal, slightly inclined axis,
    means for rotating the drum,
    friction means for engaging the underside of the drum to rotate the rollers as the drum is rotated,
    and hollow pad means having a fluid material under pressure engaging the rollers and adapted to press stems against the rollers and pull the stems from cherries.
7. The apparatus of claim 6 wherein the friction means comprises a plurality of strands under tension and looped under the drum.
8. In an apparatus for removing stems from cherries, a plurality of rollers in spaced parallel positions,
means for rotating the rollers,
an arcuate backing plate,
a flexible membrane,
means sealing the marginal portions of the membrane to the plate,
means supplying a fluid under a predetermined pressure to the space between the backing plate and the membrane,
and means holding the backing plate and the membrane in positions in which the membrane is urged by the fluid against and partially around the rollers.

9. The apparatus of claim 8 wherein the fluid is water.

10. In an apparatus for removing stems from cherries,
a plurality of rollers,
means mounting the rollers in parallel positions spaced sufficiently far apart to permit stems of cherries to extend therebetween and sufficiently close to prevent the cherries from passing therebetween,
a mounting member extending along the rollers,
a plurality of arms mounted pivotally on the mounting member in positions spaced along the mounting member,
a plurality of presser pads carried by the arms,
and cam shaft means extending along the mounting member for moving the pads seriatim into and out of engagement with the rollers.

11. The apparatus of claim 10 including means for flushing stems from each pad when it is out of engagement with the rollers.

References Cited
UNITED STATES PATENTS

| | | | |
|---|---|---|---|
| 2,356,707 | 8/1944 | Sigler | 146—2 |
| 2,194,058 | 3/1940 | Urschel | 146—55 |
| 2,621,690 | 12/1952 | Urschel | 146—55 |
| 2,713,944 | 7/1955 | Schubert | 146—55 X |
| 3,176,739 | 4/1965 | Minera | 146—55 X |

W. GRAYDON ABERCROMBIE, *Primary Examiner.*